(12) United States Patent
Barth et al.

(10) Patent No.: US 12,172,241 B2
(45) Date of Patent: Dec. 24, 2024

(54) FLUX CORE WIRE FOR A WELDING METHOD, WELDING METHOD USING THE FLUX CORE WIRE, AND METHOD FOR PRODUCING THE FLUX CORE WIRE

(71) Applicant: Renk GmbH, Augsburg (DE)

(72) Inventors: Steffen Barth, Isernhagen (DE); Martin Limmer, Sarstedt (DE)

(73) Assignee: Renk GmbH, Augsburg (DE)

( * ) Notice: Subject to any disclaimer, the term of this patent is extended or adjusted under 35 U.S.C. 154(b) by 189 days.

(21) Appl. No.: 17/351,436

(22) Filed: Jun. 18, 2021

(65) Prior Publication Data
US 2021/0394310 A1 Dec. 23, 2021

(30) Foreign Application Priority Data
Jun. 19, 2020 (DE) .................. 10 2020 116 198.0

(51) Int. Cl.
| | |
|---|---|
| *B23K 35/02* | (2006.01) |
| *B23K 9/04* | (2006.01) |
| *B23K 9/173* | (2006.01) |
| *B23K 35/30* | (2006.01) |
| *B23K 35/40* | (2006.01) |
| *C22C 9/02* | (2006.01) |

(52) U.S. Cl.
CPC .......... *B23K 35/0266* (2013.01); *B23K 9/173* (2013.01); *B23K 35/302* (2013.01); *B23K 35/406* (2013.01); *C22C 9/02* (2013.01); *B23K 9/04* (2013.01)

(58) Field of Classification Search
None
See application file for complete search history.

(56) References Cited

U.S. PATENT DOCUMENTS

| | | | | |
|---|---|---|---|---|
| 2,350,387 | A * | 6/1944 | Cito .................. | B23K 35/406 428/595 |
| 2014/0209577 | A1 * | 7/2014 | Bruck ................ | B23K 35/362 219/121.64 |
| 2019/0309405 | A1 | 10/2019 | Scott et al. | |

FOREIGN PATENT DOCUMENTS

| | | | | |
|---|---|---|---|---|
| CA | 2266814 | C * | 9/2007 | ......... B23K 35/0266 |
| CN | 107504068 | | 12/2017 | |
| DE | 10324952 | | 12/2004 | |
| DE | 10324952 | A1 * | 12/2004 | ........... B23K 35/302 |
| DE | 102006048028 | | 3/2008 | |
| DE | 102006048028 | B3 * | 3/2008 | ........... B21C 37/045 |
| DE | 102017129361 | A1 * | 6/2019 | ......... B23K 35/0266 |

OTHER PUBLICATIONS

Translation of DE-10324952-A1 (Year: 2004).*
Translation of CA-2266814-C (Year: 2007).*
Translation of DE-102006048028-B3 (Year: 2008).*
Translation of DE-102017129361-A1 (Year: 2019).*
Search Report dated Nov. 25, 2021 issued in European Patent Application No. 21180097.4.
(Continued)

*Primary Examiner* — Elizabeth M Kerr
(74) *Attorney, Agent, or Firm* — Cozen O'Connor

(57) ABSTRACT

A flux core wire for a welding method, having a tubular wire sheath, a wire core of flux powder, which is surrounded by the tubular wire sheath, wherein the wire sheath and the wire core have a composition such that during the welding a melt of $CuSn_{12}Ni_2$ materialises.

10 Claims, 1 Drawing Sheet

(56) References Cited

OTHER PUBLICATIONS

Shixian et al. "The Welding Techniques Used In Building The Largest Bronze Buddha In The World", Welding In The World, No. 4, Jul. 1, 1993, pp. 236-239.
Office Action dated Oct. 25, 2023, issued in Korean Patent Application No. 10-2021-0076826.
Office Action dated Mar. 27, 2023 issued in Korean Patent Application No. 10-2021-0076826.
Office Action dated Jun. 25, 2024 issued in Chinese Patent Application No. 202110677786.0.

* cited by examiner

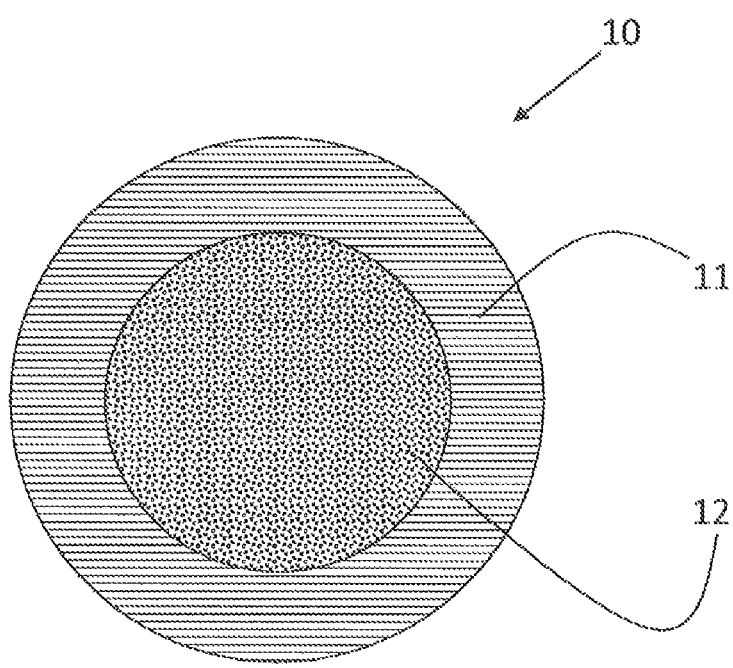

FLUX CORE WIRE FOR A WELDING METHOD, WELDING METHOD USING THE FLUX CORE WIRE, AND METHOD FOR PRODUCING THE FLUX CORE WIRE

BACKGROUND OF INVENTION

1. Field of the Invention

The disclosure relates to a flux core wire for a welding method. The invention, furthermore, relates to a welding method using the flux core wire and to a method for producing the flux core wire.

2. Description of Related Art

In welding methods known from practice, a welding wire is used that can be embodied either as a so-called solid wire or as a so-called flux core wire. Accordingly, a flux core wire for a welding method and a method and a device for producing the flux core wire are known for example from DE 10 2006 048 028 B3.

To date, repairing or building-up functional layers of $CuSn_{12}Ni_2$ or repairing or building-up existing solid material components or machine elements of $CuSn_{12}Ni_2$ by way of a welding method is difficult. The reason for this is that no suitable welding wire is known at present.

SUMMARY OF THE INVENTION

Starting out from this, one aspect of the present invention is based on creating a new type of flux core wire for a welding method, a welding method using the flux core wire, and a method for producing the flux core wire.

A flux core wire has a tubular wire sheath and a wire core of flux powder, which is surrounded by the tubular wire sheath, wherein the wire sheath and the wire core have a composition such that during the welding a melt of $CuSn_{12}Ni_2$ materialises.

With one aspect of the invention, a flux core wire for a welding method is proposed, wherein the wire sheath and the wire core have a composition such that during the welding a melt of a CuSn12Ni2 alloy materialises. By way of this, functional layers of a $CuSn_{12}Ni_2$ alloy can be both repaired and also built up by means of a welding method, namely on all known base materials, in particular on base materials or C10, C15, 16MnCr5, 42CrMo4, S355, GJL-300, GJS-400, and the like.

According to a further development of the invention, the tubular wire sheath has the following composition: Cu of a content of at least 95% by mass, in the remainder as trace elements S and/or Fe and/or Si and/or Pb and/or Zn and/or Sb and/or Al and/or O and/or Mn and/or Ag and/or Bi.

The wire core and thus the flux powder preferentially has the following composition: Cu of a content of 50 to 80% by mass, as Sn of a content of 19.99 to 40% by mass, Ni of a content of 0.01 to 10% by mass.

A sheath wire and a wire core with the compositions defined above are particularly preferred in order to provide during the welding a melt of $CuSn_{12}Ni_2$ and thus repair or build up functional layers of $CuSn_{12}Ni_2$ or a $CuSn_{12}Ni_2$ alloy or repair or build up a solid material component as machine element.

According to a further development of the invention, the tubular wire sheath has an outer diameter of 0.8 to 2 mm and a thickness of 0.05 to 0.7 mm. The flux powder of the wire core preferentially has a grain size of up to 250 μm, preferentially between 0.01 and 250 μm. Such a flux core wire is particularly suitable for welding and therefore preferred.

Preferentially, the content of the wire sheath in the flux core wire is 60±20% by mass and/or the content of the wire core in the flux core wire 40±20% by mass. These ratios of wire sheath and wire core are particularly preferred during the welding.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows The FIGURE is a cross section through a flux core wire according to one aspect of the invention.

DETAILED DESCRIPTION OF THE PRESENTLY PREFERRED EMBODIMENTS

One aspect of the invention relates to the repairing or the building-up of a functional layer or the repairing or the building-up of a solid material component as machine element of a $CuSn_{12}Ni_2$ alloy with the help of a welding method, namely to a flux core wire for such a welding method, to a welding method using the flux core wire and to a method for producing the flux core wire.

The FIGURE shows schematically a cross section through a flux core wire 10 for a welding method, wherein the flux core wire 10 comprises a tubular wire sheath 11 and a wire core 12 of flux powder.

The wire core 12 of flux powder is surrounded by the tubular wire sheath 11.

The wire sheath 11 and the wire core 12 of the flux core wire 10 have a composition such that during the welding a melt of $CuSn_{12}Ni_2$ or a $CuSn_{12}Ni_2$ alloy materialises.

By way of this, functional layers of a $CuSn_{12}Ni_2$ alloy can be advantageously repaired and built up, namely on all possible base materials.

The tubular wire sheath 11 preferentially has the following composition:
 Cu of a content of at least 95% by mass, and
 in the remainder as trace element S, and/or Fe, and/or Si, and/or Pb, and/or Zn, and/or Sb, and/or Al, and/or O, and/or Mn, and/or Ag, and/or Bi.

Preferentially, the content of Cu in the tubular wire sheath 11 amounts to at least 96% by mass, preferably at least 97% by mass, particularly preferably at least 99% by mass, or even at least 99.8% by mass.

The content of the respective trace element in the wire sheath 11, which represents an alloying element, amounts to in each case maximally 2% by mass, preferentially in each case maximally 1% by mass, preferably in each case maximally 0.5% by mass, particularly preferably in each case maximally 0.1% by mass.

The sum of Cu and the or each trace element obviously amounts to 100% by mass of the wire sheath 11 in total. Thus, when the wire sheath 11 comprises 97% by mass of Cu, the sum of all trace elements amounts to 3% by mass. When the wire sheath 11 comprises 99% by mass of Cu, the sum of all trace elements amounts to 1% by mass. When the wire sheath 11 comprises 99.8% by mass of Cu, the total of all trace elements amounts to 0.2% by mass. Percent by mass is also referred to as percent by weight.

The tubular wire sheath 11 has an outer diameter of 0.8 mm to 2 mm and a thickness of 0.05 mm to 0.7 mm.

Preferably, the tubular wire sheath 11 has an outer diameter of 1.2 mm to 1.6 mm and a thickness of 0.1 mm to 0.4 mm.

The thickness and the outer diameter of the wire sheath 11 are preferentially selected in such a manner that the content of the wire sheath 11 in the flux core wire 10 amounts to 60±20% by mass. Accordingly, the content of the wire core 12 in the flux core wire 10 amounts to 40±20% by mass.

The wire core 12 of the flux core wire 10 of the flux powder and thus the flux powder has the following composition:
Cu of a content of 50% by mass to 80% by mass,
Sn of a content of 19.99% by mass to 40% by mass, and
Ni of a content of 0.01% by mass to 10% by mass.

Preferentially, the flux powder has the following composition:
Cu of a content of 60% by mass to 73% by mass,
Sn of a content of 25% by mass to 32% by mass, and
Ni of a content of 2% by mass to 8% by mass.

In addition to Cu, Sn, and Ni, the flux powder of the wire core 12 can also contain as trace element or alloying element S, and/or Fe, and/or Si, and/or Pb, and/or Zn, and/or Sb, and/or Al, and/or O, and/or Ag, and/or Bi.

The content of each of the trace elements in the flux powder of the wire core 12 in each case amounts to maximally 2% by mass, preferentially in each case maximally 1% by mass, preferably maximally 0.5% by mass, particularly preferably maximally 0.1% by mass.

In the flux powder of the wire core 12, the total of Cu, Sn, Ni amounts to 100% by mass, while the mass contents of any trace elements that may be present are to be understood as super addition to Cu, Sn, and Ni.

Preferentially, the total of all present trace elements in the flux powder as super addition to Cu, Sn, and Ni amounts to maximally 5% by mass, preferably maximally 3% by mass, particularly preferably maximally 2% by mass or even maximally 1% by mass.

The flux powder of the wire core 12 is preferentially ideally spherical flux powder, which does not form any clumps during melting. The powder particles of the flux powder are solid and preferentially do not have any hollow spaces.

A grain size of the flux powder of the wire core 12 is up to 250 μm, wherein the flux powder of the wire core 12 can comprise powder grains with different grain sizes between 0.01 μm and 250 μm. In this grain size range, the flux powder can have a grain size distribution.

The flux powder of the wire core 12 of the flux core wire 10 is preferentially a master alloy of the abovementioned elements which are produced for example by gas atomisation.

The flux core wire 10 is preferentially wound on a coil and can be unwound from the coil during the welding.

In a concrete exemplary embodiment the following is true of a flux core wire 10:
Outer diameter of the wire sheath 1.2 or 1.6 mm;
Thickness of the wire sheath 0.1 or 0.3 mm;
Cu content of the wire sheath: 99.8% by mass.
In the remainder in total 0.2% by mass of trace elements of the wire sheath:
Cu content of the flux powder: 65% by mass;
Sn content of the flux powder: 30% by mass;
Ni content of the flux powder: 5% by mass.
As super addition, in total maximally 2.5% by mass of trace elements of the flux powder.

In the concrete exemplary embodiment of the flux core wire, the flux powder of the wire core 12 has a grain size between 0.01 and 250 μm.

The grain size distribution is preferentially as follows:
10% of the powder particles with a grain size between 0.01 and 44.99 μm;
85% of the powder particles with a grain size between 45 and 200 μm; and
5% of the powder particles with a grain size between 200.01 and 250 μm.

One aspect of the invention, furthermore, relates to a welding method using the flux core wire described above, namely for the repair or for the building-up of a functional layer of a $CuSn_{12}Ni_2$ alloy or for repairing or building up a solid material component as machine element of a $CuSn_{12}Ni_2$ alloy.

Functional layers can be built up in single layer or multiple layers with a thickness between preferentially 0.05 mm and 15 mm.

Possible welding methods employed are MIG welding method or MAG welding method.

In particular, the functional layer to be built up or repaired is a tribological functional layer, for example, a sliding bearing layer of a sliding bearing from the fields of drive technology such as wind power (offshore/onshore), energy sector, automotive sector, transmission technology, machine elements from the fields of sealing technology, or the like. Furthermore, it can be a machine component as solid material machine element from the abovementioned fields of application, which are completely built up of the mentioned material or repaired.

Furthermore, one aspect of the invention relates to a method for producing the flux core wire 10 described above. Here, a metal sheet for the wire sheath 11 is initially provided which has the abovementioned composition. The thickness of the metal sheet preferentially amounts to between 0.05 mm and 0.7 mm. A blank for the wire sheath 11 is cut from the metal sheet. Furthermore, the flux powder for the wire core 12 is provided, which is in particular a flux powder with a defined grain size distribution, wherein the powder particles have the composition stated above and preferentially consist of a master alloy produced for example by gas atomisation.

Following the cutting off of the blank for the wire sheath 11, the blank for the wire sheath 11 is formed into the wire sheath 11 wherein a hollow space of the wire sheath 11 is filled with the flux powder, namely during and/or after the forming of the blank for the wire sheath 11. In the process, the wire core 12 is formed of the flux powder. Following the forming of the blank into the wire sheath 11, adjoining edges of the metal sheet can be joined to form the wire sheath 11 via a folding seam or weld seam. The flux powder of the wire core 12 is held in the wire sheath 11 by way of frictional engagement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A flux core wire for a welding method to repair or build-up a functional layer of a sliding bearing, comprising:
    a wire sheath, which is tubular and having a content of Cu of at least 95% by mass; and
    a wire core of flux powder that is surrounded by the wire sheath, which is tubular,
wherein the wire sheath and the wire core have a composition such that a melt of $CuSn_{12}Ni_2$ materialises during welding,
wherein the wire core and thus the flux powder comprises:
    a content of Cu of 50 to 80% by mass;
    a content of Sn of 19.99 to 40% by mass; and
    a content of Ni of 0.01 to 10% by mass,
    wherein a total of Cu, Sn, Ni amounts to 100% by mass; and
wherein:
    the flux powder of the wire core comprises as one or more trace elements S, and/or Fe, and/or Si, and/or Pb, and/or Zn, and/or Sb, and/or Al, and/or O, and/or Mn, and/or Ag, and/or Bi,
    a content of a respective trace element in the flux powder of the wire core as a super addition in each case amounts to maximally 0.5% by mass,
    a content of the wire sheath in the flux core wire amounts to 60±20% by mass, and
    the content of the wire core in the flux core wire is the remainder thereof.

2. The flux core wire according to claim 1, wherein the wire sheath comprises:
    a remainder as trace element S, and/or Fe, and/or Si, and/or Pb, and/or Zn, and/or Sb, and/or Al, and/or O, and/or Mn, and/or Ag, and/or Bi.

3. The flux core wire according to claim 2, wherein a content of the respective trace element in the wire sheath amounts to maximally 0.1 by mass.

4. The flux core wire according to claim 2, wherein the wire sheath comprises at least one of:
    the content of Cu at least 96% by mass,
    the content of Cu at least 97% by mass, and
    the content of Cu at least 99% by mass.

5. The flux core wire according to claim 1, wherein the wire sheath has:
    an outer diameter of 0.8 to 2 mm and
    a thickness of 0.05 to 0.7 mm.

6. The flux core wire according to claim 1, wherein the wire core and thus the flux powder comprises:
    a content of Cu of 60 to 73% by mass;
    a content of Sn of 25 to 32% by mass; and
    a content of Ni of 2 to 8% by mass.

7. The flux core wire according to claim 1, wherein the flux powder of the wire core has a grain size of up to 250 µm.

8. A welding method comprising:
    providing a flux core wire according to claim 1,
    performing one of a MIG welding method or a MAG welding method for a repair or a building-up of a functional layer or for building up a solid material component as machine element of a $CuSn_{12}Ni_2$ alloy.

9. The welding method according to claim 8, wherein the functional layer is a sliding bearing layer of a sliding bearing.

10. A method for producing a flux core wire according to claim 1, having a tubular wire sheath and a wire core of flux powder that is surrounded by the tubular wire sheath, wherein the tubular wire sheath and the wire core have a composition such that a melt of $CuSn_{12}Ni_2$ materialises during welding, comprising:
    providing a metal sheet for the wire sheath;
    cutting off a blank for the tubular wire sheath;
    providing the flux powder for the wire core;
    forming the blank for the wire sheath into the tubular wire sheath with a hollow space; and
    filling the hollow space of the tubular wire sheath with the flux powder during and/or after the forming of the blank for the wire sheath into the wire sheath forming the wire core.

* * * * *